(12) United States Patent
Hall et al.

(10) Patent No.: US 8,701,173 B2
(45) Date of Patent: *Apr. 15, 2014

(54) SYSTEM AND METHOD FOR PROVIDING SILENT SIGN ON ACROSS DISTRIBUTED APPLICATIONS

(75) Inventors: Ian G. Hall, San Francisco, CA (US); Michael B. Brietzke, Pleasant Hill, CA (US); Janardhan Kakarla, Dublin, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 12/705,500

(22) Filed: Feb. 12, 2010

(65) Prior Publication Data

US 2010/0146613 A1     Jun. 10, 2010

Related U.S. Application Data

(63) Continuation of application No. 10/990,024, filed on Nov. 16, 2004, now Pat. No. 7,702,794.

(51) Int. Cl.
| | | |
|---|---|---|
| *G06F 7/04* | (2006.01) |
| *G06F 12/14* | (2006.01) |
| *H04L 29/06* | (2006.01) |
| *H04L 9/32* | (2006.01) |
| *G06F 21/00* | (2013.01) |
| *G06F 15/16* | (2006.01) |
| *G06F 15/173* | (2006.01) |

(52) U.S. Cl.
USPC ........ 726/8; 726/5; 726/23; 726/27; 713/165; 713/168; 713/170; 713/182; 709/219; 709/225

(58) Field of Classification Search
USPC .............. 726/8, 5, 23, 27; 713/165, 168, 170, 713/182; 709/219, 225
See application file for complete search history.

(56) References Cited

U.S. PATENT DOCUMENTS

| | | |
|---|---|---|
| 5,708,780 A | 1/1998 | Levergood et al. |
| 5,875,296 A | 2/1999 | Shi et al. |
| 5,987,611 A | 11/1999 | Freund |
| 5,999,971 A | 12/1999 | Buckland |
| 6,092,196 A | 7/2000 | Reiche |
| 6,332,161 B1 | 12/2001 | Sasson |
| 6,523,022 B1 | 2/2003 | Hobbs |
| 6,529,952 B1 | 3/2003 | Blumenau |
| 6,591,228 B1 | 7/2003 | Hall et al. |
| 6,668,322 B1 | 12/2003 | Wood et al. |
| 6,681,205 B1 | 1/2004 | San Martin et al. |
| 6,714,948 B1 | 3/2004 | Richards |

(Continued)

*Primary Examiner* — Aravind Moorthy
(74) *Attorney, Agent, or Firm* — Kilpatrick Townsend & Stockton LLP (57) ABSTRACT

A system and method is provided for a distributed computing system where a user can login to a client computer and access a number of different applications installed on web servers. These applications are then provided access to data in mainframe systems without a user having to enter mainframe user id or password information for gaining access to the mainframe system. The system and method can utilize a sign on object which is installed onto the client computer. The sign on object operates to obtain and transmit a security token which authorizes access to the mainframe system, and the security token does not require the use of the cookie data. This system and method can pass the security token through the web server and the web application in an encrypted form which limits security risks.

20 Claims, 5 Drawing Sheets

(56) References Cited

U.S. PATENT DOCUMENTS

| | | | |
|---|---|---|---|
| 6,725,269 B1 | 4/2004 | Megiddo | |
| 7,392,536 B2 | 6/2008 | Jamieson et al. | |
| 7,530,099 B2 * | 5/2009 | Flurry et al. | 726/8 |
| 7,603,555 B2 | 10/2009 | Schmidt et al. | |
| 7,702,794 B1 | 4/2010 | Hall et al. | |
| 2001/0039565 A1 | 11/2001 | Gupta | |
| 2002/0010776 A1 | 1/2002 | Lerner | |
| 2003/0018901 A1 * | 1/2003 | Burritt et al. | 713/185 |
| 2003/0033535 A1 | 2/2003 | Fisher et al. | |
| 2003/0037138 A1 * | 2/2003 | Brown et al. | 709/225 |
| 2003/0105981 A1 | 6/2003 | Miller et al. | |
| 2003/0145224 A1 * | 7/2003 | Bailey | 713/201 |
| 2003/0188193 A1 | 10/2003 | Venkataramappa | |
| 2003/0191826 A1 * | 10/2003 | Bellinger et al. | 709/220 |
| 2004/0093582 A1 * | 5/2004 | Segura | 717/102 |
| 2004/0098595 A1 * | 5/2004 | Aupperle et al. | 713/185 |
| 2004/0107269 A1 * | 6/2004 | Rangan et al. | 709/219 |
| 2004/0199795 A1 | 10/2004 | Grewal et al. | |
| 2004/0236938 A1 | 11/2004 | Callaghan | |
| 2005/0005094 A1 | 1/2005 | Jamieson et al. | |
| 2005/0149576 A1 * | 7/2005 | Marmaros et al. | 707/200 |
| 2006/0041933 A1 | 2/2006 | Yakov et al. | |
| 2007/0190977 A1 | 8/2007 | Fok et al. | |
| 2007/0199056 A1 | 8/2007 | Bhatia et al. | |
| 2008/0263640 A1 | 10/2008 | Brown | |

* cited by examiner

SYSTEM AND METHOD FOR PROVIDING SILENT SIGN ON ACROSS DISTRIBUTED APPLICATIONS

CROSS-REFERENCE TO RELATED APPLICATIONS

This application is a continuation of and claims benefit of priority of U.S. patent application Ser. No. 10/990,024, filed on Nov. 16, 2004, the disclosure of which is herein incorporated by reference in its entirety for all purposes.

FIELD OF THE INVENTION

The invention herein relates to a system and method which provide for reducing the number of times that a user must go through login procedures to access different applications distributed across a number of different computers in a distributed computer network.

BACKGROUND

In a number of distributed computing environments, a challenge has arisen due to the number of times during the course of a day that employees must log into different applications that they use during their work. For example, a customer representative in a brokerage company might need to access five or six different software applications during a course of a typical day (depending on particular circumstances this number could be significantly higher). In addition to needing to access a number of different applications the customer representatives will frequently need to enter and exit a number of the same applications repeatedly during the day. With each time a user exits an application, the system can require that the user go through log in procedures to allow the application to access the underlying data accessed by the application.

Figure 1A:
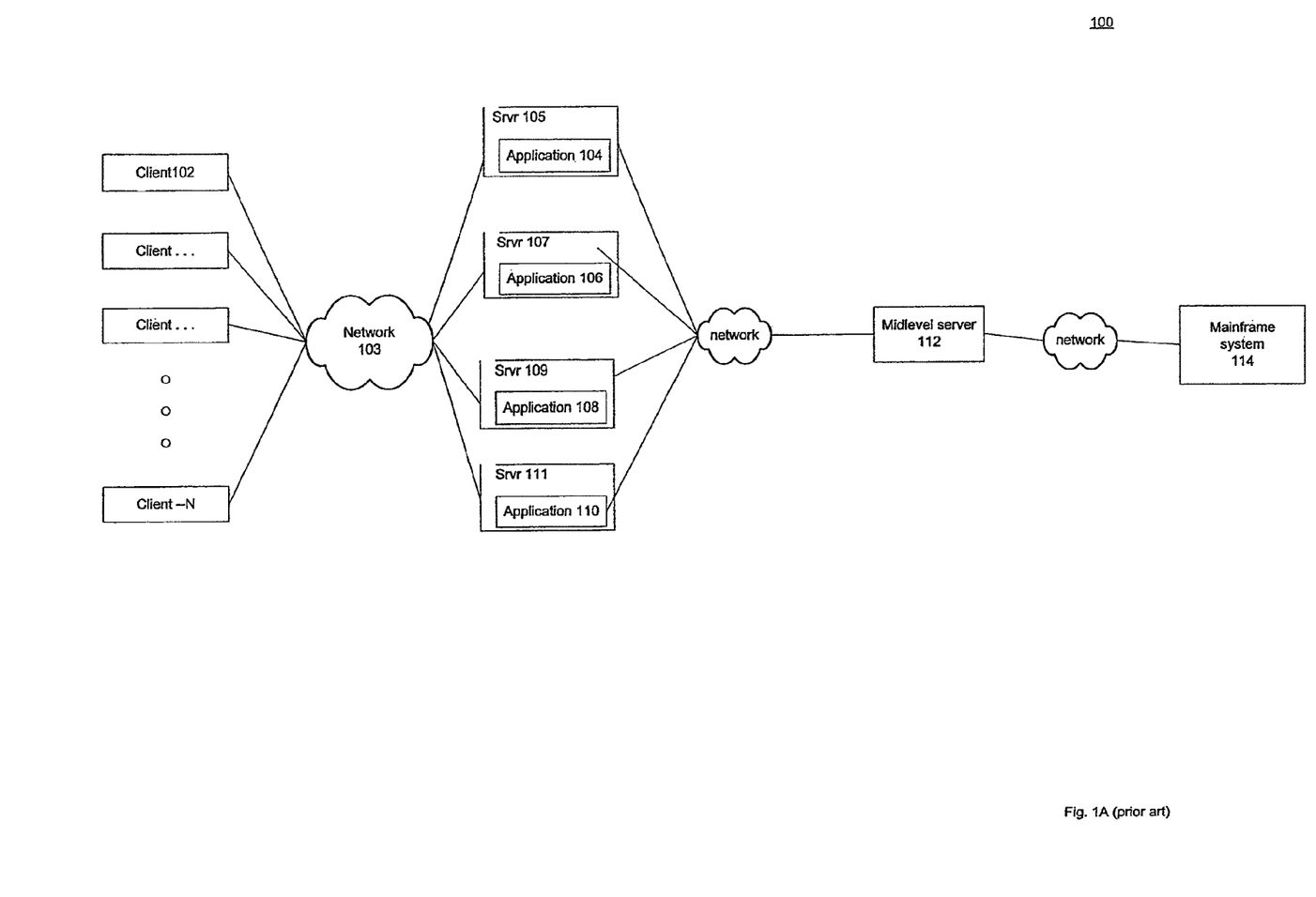
FIGS. 1A-1B show a distributed computing system, and general computer system, of the prior art.

An existing system 100 is shown in FIG. 1. The system 100 provides a number of client computers 102 . . . N. In some environments there could be hundreds of client computers. Each of these client computers is then connected to a network 103, such as local area network, wide area network, or other communication network. Also, connected to the network 103 are a number of web servers (105 and 107, 109, 111) on which a variety of different web applications 104-110 are loaded. In some situations, the network 103 might be connected with additional networks (the network also could be considered to be a single network which includes the entirety of the different computers, switches, routers, servers and mainframes etc. which are interconnected) to provide a client computer with a direct connection to a mainframe 114 system.

Figure 1B:
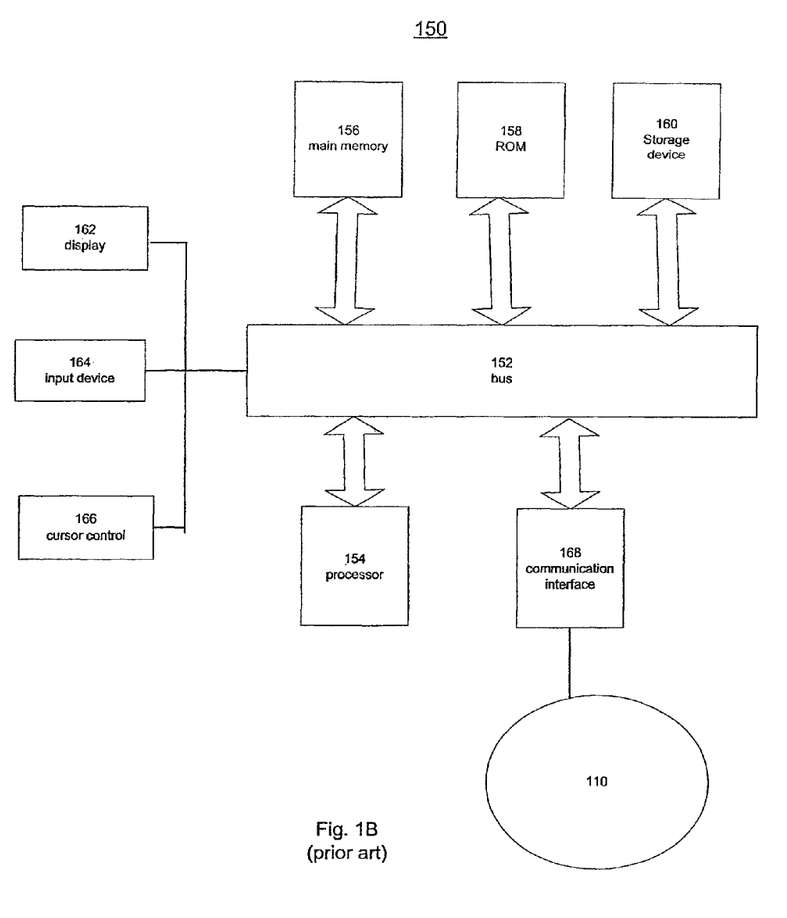

For purposes of general reference, FIG. 1B is provided which shows the general configuration of a computer. Computer system 150 includes a bus 152 or other communication mechanism for communicating information, and a processor 154 coupled with bus 152 for processing information. Computer system 150 also includes a main memory 156, such as a random access memory (RAM) or other dynamic storage device, coupled to bus 152 for storing information and instructions to be executed by processor 154. Main memory 156 also may be used for storing temporary variables or other intermediate information during execution of instructions to be executed by processor 152. Computer system 150 further includes a read only memory (ROM) 158 or other static storage device coupled to bus 152 for storing static information and instructions for processor 154. A storage device 160, such as a magnetic disk or optical disk, is provided and coupled to bus 152 for storing information and instructions.

A display 162 can be coupled to the bus 152 displaying information to a computer user. As discussed below images shown on the display to convey information to a user can be referred to as screen shot. An input device 164, including alphanumeric and other keys, is coupled to bus 152 for communicating information and command selections to processor 154. Another type of user input device is cursor control 166, such as a mouse, a trackball, or cursor direction keys for communicating direction information and command selections to processor 154 and for controlling cursor movement on display 162. Computer system 150 also includes a communication interface 168 coupled to bus 152. Communication interface 168 provides a two-way data communication coupling to the network 110.

One or more processors in a multi-processing arrangement may also be employed to execute the sequences of instructions contained in main memory 156. In alternative embodiments, hard-wired circuitry may be used in place of, or in combination with, software instructions to implement the invention.

The invention discussed herein is related to use of multiple computer systems coupled together through a network, or networks. In general the client computers can be any of a range of different types of personal computers; one embodiment described herein contemplates a client computer being a personal computer (pc) using a Pentium type or equivalent processor, and client computer being loaded with the Windows operating system from Microsoft, and loaded with a browser application. A browser is an interactive program loaded on the client computer which allows a user to select and view documents (such as HTML) and access files and software related to those documents at different addresses or URLs. Browsers can utilize hyperlinks, which allow users to point and click with a mouse in order to jump from document to document in whatever order they desire. Browser operations can sometimes include executing small programs, such as Java applets or ActiveX controls included by programmers in the documents. Helper applications or plug-ins are required by some Web browsers to accomplish one or more of these tasks.

The discussion herein also contemplates use of web servers. The web servers are computers which generally include the elements described above in connection with FIG. 1B. The processor of a web server (also sometimes referred to as an HTTP server) is programmed to provide for communications and operations in accordance HTTP procedures. The web server can also be loaded with applications which provide for performing different operations, and presenting pages generated by these applications to users of client computers through a browser. The web server can also transmit other information, files and scripts (software code) to client computers. Web servers are frequently used on both internet sites and company, or enterprise, intranets. Generally the web servers will utilize a Unix or Linux type of operating system, but other operating systems could also be used.

A mainframe computer generally includes the components discussed above in connection with FIG. 1B, however, a mainframe computer is typically much more powerful and complex then a web server or a client computer. A mainframe computer in the past might have been programmed with the MVS operating system from IBM, newer mainframe operating systems include zOS from IBM. One new mainframe model available from IBM is the Z990 mainframe computer. The mainframe computer can include multiple processors working in parallel to speed processing of information, and can typically support a large number of users, or operations occurring nearly simultaneously.

One challenge in the operation of system 100 is that many of the applications (such as say for example applications 104 and 106) residing on the web servers 105 and 107 need to access data which resides in mainframe system 114 (the mainframe system can include extensive storage devices for databases, such as IBM's DB2 database). For example, some financial analysis applications can reside on a web server, and a user of the client computer, for example, a brokerage representative in a branch office, may need to use the financial analysis application to provide advice to a brokerage customer; such an analysis application, will typically need to pull up account information for the brokerage client, so that the analysis can take into account the brokerage client's present holdings, and possibly make recommendations as to whether certain assets should be held or sold in the brokerage account.

In the system 100 the brokerage customer account information resides not in the web server application layer, which includes web servers on which web applications 104-110 are loaded, but it instead resides in mainframe environment 114 which is linked to the application layer through middle layer 112, sometimes referred to as middle ware. The middle layer can include a number of computers, such as servers, which are loaded with software which operates to provide an interface between web applications and the mainframe 114. This interface allows the web applications to enter information into databases of the mainframe environment 114, or access information from the databases of the mainframe environment. In one embodiment the middleware 112 includes a number of IBM P680 computers, loaded with a Unix type operating system. The middleware operates to provide a number of functions in the system 100. For example, the middleware can provide for load balancing among a number of different computers of the mainframe environment 114, such that if one computer of the mainframe environment is loaded with particularly high volume of traffic, or computational demands, then the middleware can operate to direct new requests to a different computer in the mainframe environment. The middleware can also route certain requests for information to particular components of the mainframe environment to expedite handling of certain requests. Additionally, the middleware operates to provide an interface between the operating environment, operating systems, languages, and protocols of the web application servers, and the mainframe environment 114. The middleware, can also provide for communications between non-web based applications (not shown) and the mainframe environment. For example, a user might access the mainframe 114 through the middleware from a personal computer, rather than through a web based application, or a user might use voice commands to enter certain requests to exchange information with the mainframe computer. Whatever the particular case, the middleware components can be programmed to provide for a broad interface between the mainframe environment and a range of external applications.

It should also be recognized that as shown in system 100 not all web-based applications require access to the mainframe environment. For example, application 108 could be a customer relationship management (CRM) application, such as supplied by Siebel, of San Mateo, Calif., and it could utilize an Oracle database (from Oracle of Redwood Shores, Calif.) which is connected to, or incorporated into the web application server on which application 108 is loaded. For such an application, some of the complexities associated with interfacing with the mainframe environment are alleviated.

Where the web application needs access to data in the mainframe environment, obtaining access to the mainframe system has, in many prior systems, required that the user provide a user id and a password for access to the mainframe. Generally, the user id and password for the mainframe is different than the user id and password for logging onto the client computer. The operation of one such system 200 is described below in connection with FIG. 2. Where the web application does not require access to the mainframe environment, solutions exist which allow access to various web servers and web databases, that do not require that the user enter additional user id and password information. These solutions such as the Netpoint/Oblix software package generally utilizes HTTP cookies where the web server and the web application operate to store necessary security data in HTTP cookies which allows a user access to necessary information. The mainframe environment of system 100 is not able to effectively utilize the HTTP cookie to control access to data in mainframe environment 114.

Figure 2:
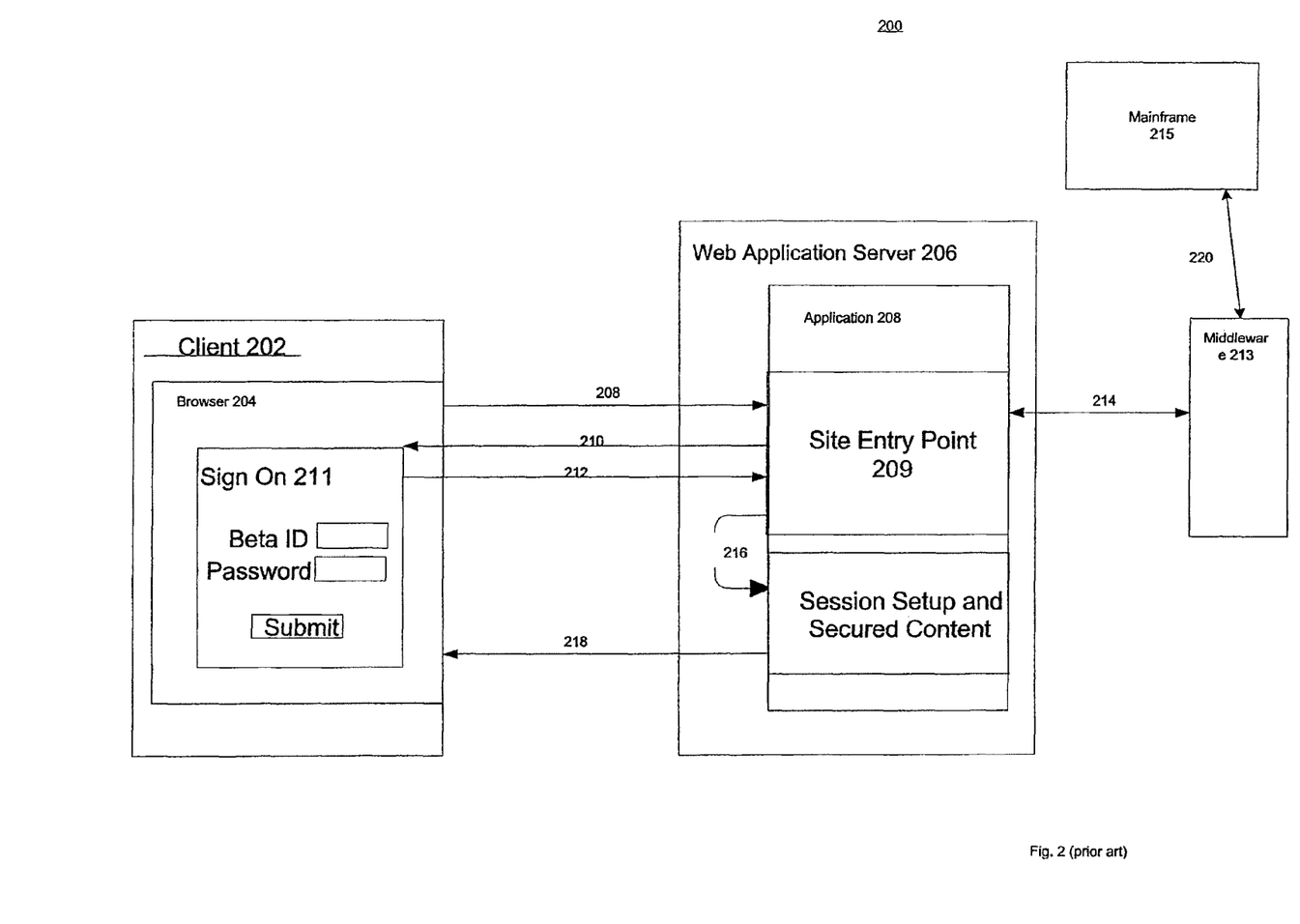
FIG. 2 illustrates a security login procedure of the prior art.

FIG. 2 shows the operation of the system 100 where a client computer 202 is loaded with a browser 204. In operation the user of the client computer will initially login to the client computer, which for a windows type computer, would require the user inputting his/her Windows user id and password for a client computer. Upon logging in the user could then point the browser 204 to an application 208 loaded on web application server 206. In response to receiving an indication that the browser 204 has been pointed at the application 208, the application invokes security/log on procedures shown as Site Entry Point 209. The log on procedure of the application then forwards 210 a sign on page 211 to the browser, which is shown on a display. The user then inputs his/her mainframe user, or beta, ID, and a mainframe user password, typically using standard input devices such as a mouse and keyboard. This is the user id and password which is provided to a user for gaining access to the mainframe system 215, and generally the mainframe user id and password are different than the local system (client computer) user id and password.

Once the user has input the mainframe user id and the password, the user will click on the submit button on the page 211, and the user id and password will be transmitted to the site entry point 209. The security/log on procedures 209 then calls 214 to the middleware layer which operates to validate the mainframe beta ID and password, and if they are validated, the middleware layer 213 generates a security token which is cached. With the security token a web application server session can be established 216 for the user who has logged client computer 202. Once the session has been established the application can access necessary data from the mainframe environment 215 (through the middleware 213). The mainframe system 215 will store the user id and password for the user who is using the selected application, and will still operate to restrict the user's access to data to which a user has not been granted access. The application 208 will communicate 218 the secure content to the user through the browser 204.

When the user is done with the selected application 208, and points the browser to the address of a different application, the subsequently selected application will present the user with another sign on page 211, and the security/logon procedures will be repeated. This approach requires that each time a user changes applications which accesses information stored in the mainframe environment, the user will have to input login information to a sign on page. Over the course of a day where a user may have to frequently switch between a number of different applications, this repeated inputting of login information can lead to inefficiencies. To deal with this problem a number of different single sign on systems and methods have been developed. However, it is believed that these previous single sign on procedures are not optimal for an environment where a client is accessing web applications through a client computer, and the web application must access data from a mainframe environment.

DETAILED DESCRIPTION

Figure 3:
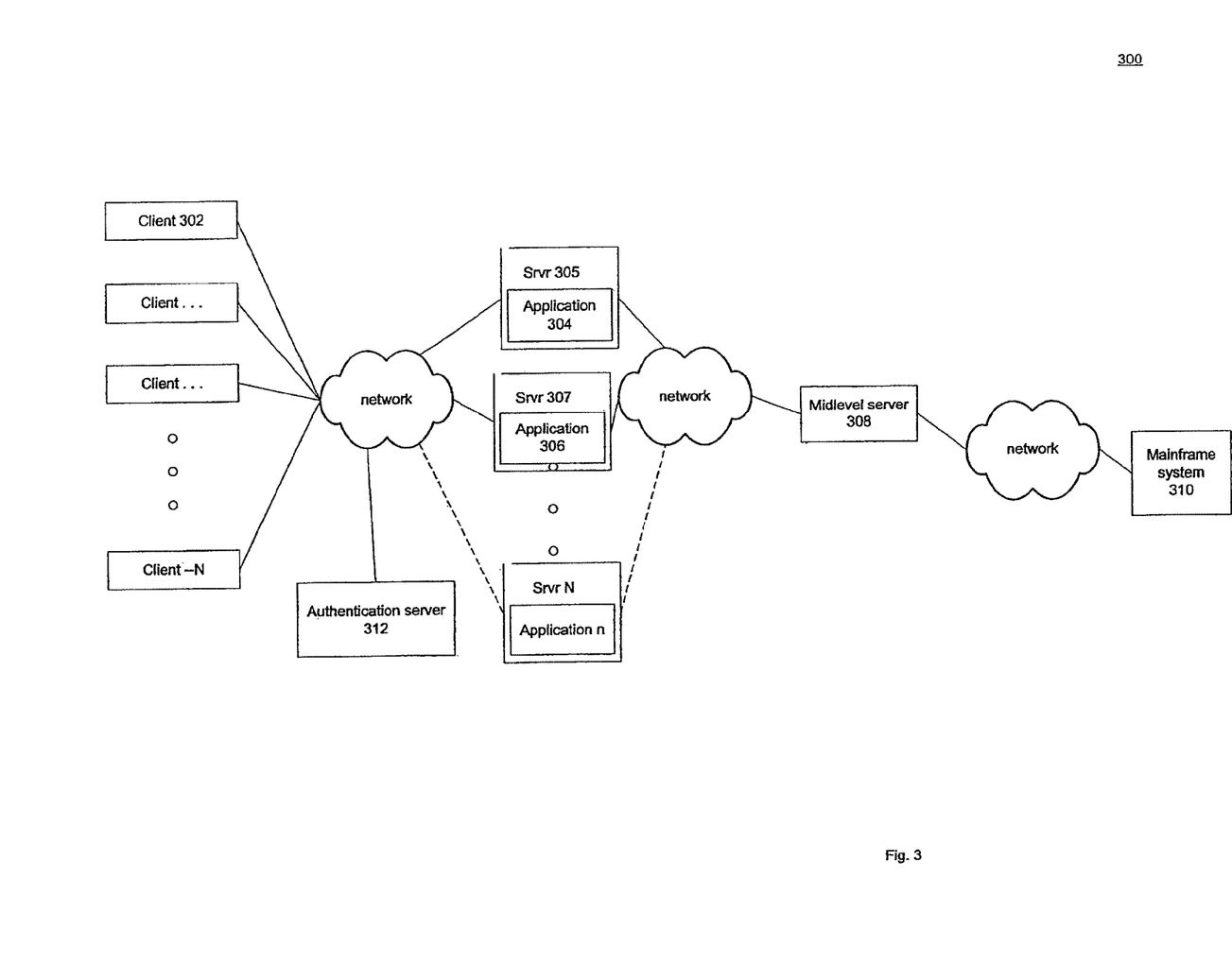
FIG. 3 illustrates an embodiment of a distributed computing system of the present invention.

An embodiment of the invention herein is shown in FIG. 3. The system 300 can include a plurality of client computers 302 . . . N. In some embodiments there could be hundreds, or possibly thousands, of client computers connected to the network. The client computers could be a standard IBM compatible personal computer, from a wide range of different manufacturers. Indeed some embodiments could allow for use of a wide range'of different client computers. The embodiment discussed herein contemplates a personal computer with the Microsoft Windows Operating System; of course in some embodiments alternative client computing devices could be used. The client computer is also loaded with a browser application. One widely used browser is Microsoft's Internet Explorer. The system 300 can include a large number of different web applications 304, 306 . . . N loaded on a number of different web servers 305, 307, . . . N. For purposes of discussion two applications 304 and 306 are assumed to be applications which require access data in the mainframe system 310 through the middleware level 308. As will be discussed in more detail below in connection with FIG. 4, the client computer is loaded with software, which modifies the operation of the client computer, so that the user of the client computer will not need to input the mainframe user id and password information each time the user enters a new application which accesses data from the mainframe environment 310.

Although not shown in FIG. 3, the system 300 would also typically include a number of additional web applications on web application servers, which do not need access to the mainframe environment. One example, of such an application, as discussed above, is the CRM software provided by Siebel, which accesses data in an Oracle database. For such applications which do not access the mainframe environment, the log on procedures which are presently used do not need to be altered by implementation of the present invention.

Figure 4:
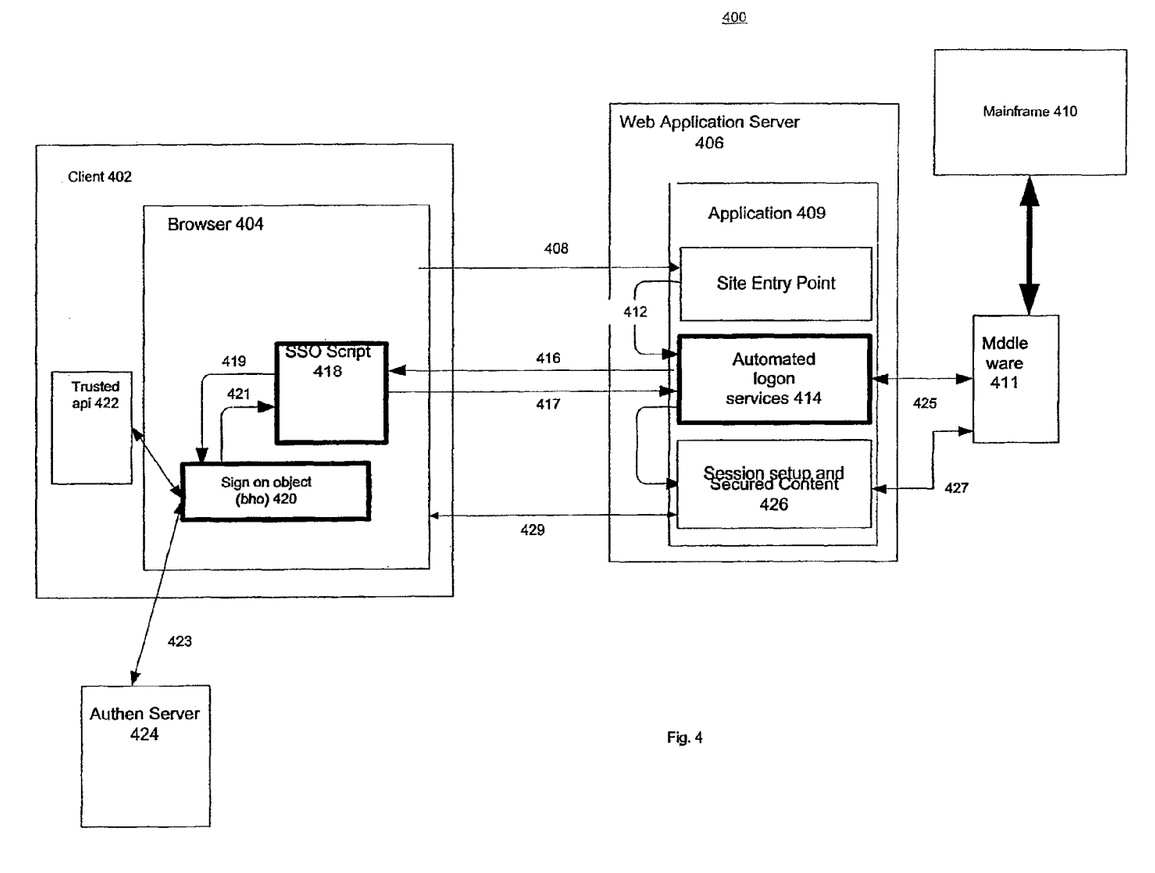
FIG. 4 illustrates an embodiment of a security/login procedure of the present invention.

The operation of an embodiment of a system and method herein is shown in FIG. 4. The client computer 402 loaded with the Windows operating system provides for a user initially logging in using a local system (in this case a client computer) user id and a password. In one embodiment the local system user id and password would be the Windows user id and password. Once the user has logged onto the client computer, the user can then access web applications using the browser 404 loaded on the client computer. The operation provides that when the selected application 409 on the web application server 406 receives a signal 408 that the browser is pointing at application 409, the selected application 409 invokes 412 an automated security/log on module 414, at times referred to herein as a silent sign on module procedures. The automated security/logon module operates to send a sign-on procedure signal 416 which can include script code 418 from the application 409 to the browser 404. It should be noted that in the embodiment illustrated in FIG. 4 the arrows shown in the figures between the client computer 402, the authentication server 423, the web server 406, the middleware 411, and the mainframe 410, illustrate signals, such as data packets or information, being transmitted between these different elements of the distributed system. Typically, these signals are routed through a network to which each of the elements is connected. These networks could be Ethernet, LAN/WAN networks, the Internet, wireless networks, etc. or a range of the other communication networks. This figure illustrates the method of operation and different elements of system 400.

The script code is 418 is received by the client browser 404, and instructs an automatic sign on module, shown as sign on object 420 to follow automated login procedures defined in the sign on object. The sign on object 420, can be implemented as a browser helper object, where a browser helper object is understood to be a software module which is incorporated into a browser, to add additional functionality to the browser. In some cases such objects are used by hackers to provide for undesirable modifications in the browser operation. In an embodiment herein, however, the sign on object 420, is designed to provide important and beneficial functionality to the browser 404.

As browser helper object (BHO) is a DLL that allows developers to customize and control the browser. In one embodiment when the browser starts, it reads a registry to locate installed BHOs, and then creates the BHO. The BHO then has access to the events and properties of the browsing session, and the BHO can add functionality to allow the browser operation session to go beyond the normal functions of the browser, and to process and generate communications with processors outside of the client computer.

In one embodiment herein, after receiving a signal 419 from the script code 418, the sign on object 420 queries a table which has been loaded onto the client via a trusted site application program interface 422. The table 422 identifies applications that are trusted applications, which are to be used in connection with the automated logon procedures.

In one embodiment the table of trusted sites is generated each time the browser is restarted. When the browser is restarted a signal is transmitted to the mainframe system 410, and in response the mainframe system transmits a signal to the client 402. This signal is received and processed by the Trusted API 422 which is installed on the client, and can be part of the sign on object. Using the data in the signal from the mainframe system 410, the trusted API 422 builds the table of trusted sites. When the sign on object 420 determines that an application is a trusted site (or application) where a site could be a reference to a url, or address, or file location of the application, then the sign on object 420 proceeds to the next step in the process. At this point the sign on object initiates communications 423 with an authentication server 424, at which point the server 424 reviews a user id data base or table (which can be stored in the server or external to the server). The user id information correlates local login id for users with the mainframe user id and is referred to as an authentication table. Thus, using data from the client computer the authentication server 424 identifies the user logged on to the client computer, and then using user id correlation information in the authentication table the server then identifies the users mainframe user id. The authentication server 424 then generates and transmits a security token to the sign on object 420. The sign on object 420 then utilizes the sign on script 418 to forward 417 the security token to the security/logon procedures 414 of the application 409. The logon procedures 414 then communicate 416 with the middleware 411 to forward the security token to the middleware 411. The middleware computer 411 receiving the security token then analyzes the format of the security token to verify that it is an authentic security token, such that, among other things, the mainframe system 410 can use the information from the security token to determine what level of access a particular user should be given to data and possible applications residing in the main frame system. Assuming that the security token is valid, a session 426 is setup and communication 427 of restricted information can be obtained from the mainframe system 410 through the middleware 411.

In one embodiment the security token is a relatively small packet of data which is 50 bytes long. In this embodiment the security token includes the user's id for the mainframe environment, and it also includes data identifying the client computer on which the user has logged on. In one embodiment the authentication server 424 is able to obtain the IP address for the client computer from the sign on object 420, and the IP address is then incorporated into the security token generated by the authentication server 424. The security token can also include a number of initial data elements which identify the packet of information, as a security token, so that the middleware 411 can initially identify a received data packet as a security token. The security token can be encrypted using triple-DES encryption procedures which are known in the art.

The middleware layer 411 operates to provide a degree of screening and analysis regarding the security token, and if the security token is not properly formatted, or it includes clearly erroneous security information, the middleware can operate to block the users access to the mainframe system 410 through the selected application. In one embodiment the Authentication server 424 operates to encrypt the security token. As mentioned above a security token can include information such as a user id. Additionally, depending on the implementation of the system, the security token could also include additional information such as a password corresponding to the mainframe user id, and the user id information referred to by the authentication server 424 could include both user id and password information. The encrypted security token is then passed through the client 402 and the application 409 to the middleware layer where it is decrypted and can be passed on to the mainframe system. Once the security information in the security token has been verified, a request is forwarded to the application session setup module 426, and a server session is established for the user, and information including data from the mainframe system can be passed 429 to the browser 404 of the client 402.

The method and system described above provide a number of advantageous elements. For example, the automated logon procedure allows a user to logon to the client machine and then to move easily from one application to another without having to input user name and password information when one switches between applications.

Another element of the embodiment described above is that the security token is encrypted as it is being passed through much of the distributed computing system. Indeed, it is not until the security token reaches the secure middleware 411 that it is decrypted. Further, all of the distributed computer system can be protected by a firewall, such that each of the elements shown in FIGS. 3 and 4 are behind a firewall. Another additional security feature is that even if someone managed to penetrate the firewall, they would still need to have sign on object 420 incorporated into a browser in order to properly execute the automated sign on procedures.

Another feature is that the tables generated by the Trusted API function can be easily updated. For example, a network administrator can easily update the identification of trusted sites or applications, in the mainframe system. The trusted table information in each of the client computers is then automatically updated each time the browser is restarted on the client computer. Thus, by providing for central data table of authorized applications, which is then automatically disseminated through software loaded on each of the clients, frequent changes can be made to the system configuration without requiring that administrators proceed to manually address updating the information in each of the client computers.

Another factor to be considered in the embodiments described above is that when a user has logged on to the client computer, the client computer is then able to access the mainframe data, as determined by the user id stored in the Authentication server. Thus, if a user were to login and then leave a client computer, and an unauthorized user were to then start using the client computer that the authorized user had logged into, the unauthorized user would be able to access the mainframe data through applications without having to input any further user ids or passwords. The risk of unauthorized users gaining access to the system can be diminished by having the client computer automatically go into a locked mode after a specified period of inactivity. As is known many computer operating systems allow a user to select a desired period of inactivity which will cause a computer to go into a locked or stand by mode, which requires that a user input password and user id information to again use the computer. Indeed, in one embodiment of a system herein the sign on object might receive settings for client computers from the mainframe system along the same lines as the information for the trusted sites table, and then these selected time periods from the mainframe would be loaded into the operating system to determine an automatic lock up time period for the client computer.

In some the web applications which include the automatic sign on procedures for access to the mainframe there can also be included a back up mode of operation wherein if the automatic sign procedures fail to provide a usable or operable security token; the application will provide the browser of the client computer with a traditional login page prompting the user to input a password and a user id, as described above in connection with FIG. 2.

The encryption method used for the security token could utilize any of a wide range of possible encryption methods. Further, it is noted that while secure socket layer (SSL) protection is not generally likely to be required, given that all of the components are already behind a secure firewall, SSL could be added as an enhanced security feature. Further, it should also be noted that some implementations of the system and method herein could provide for utilizing some components which are not located within a common firewall. In such a situation, then it may be more desirable to utilize SSL or other types of higher levels of protection.

Given the role of the sign on object in automatic sign on operations, it is important that access to the administrative controls of the client computer be restricted such that unauthorized users cannot access or modify the operation of the sign on object. Typically, the operating systems of the of the client computers can be configured such that only authorized system administrators can access system files and applications loaded on the client computers.

An attractive characteristic of the system and method herein is that it can in many cases it can be implemented on hardware which is found in many typical distributed systems which couple web applications and web servers with mainframe systems. An important element in such an implementation is that there be an authentication server which can communicate the sign on object. Further it should be recognized that in other embodiments other means for providing table information cross referencing local login information with mainframe login information, which could be used in connection with generating a security token.

Another attractive element of some embodiments herein is that the security token operation herein does not rely on HTTP cookies for providing login and security information for gaining access to the mainframe system. This can be advantageous because mainframe systems typically are not designed for utilizing cookie information for controlling access to data and logon procedures. Further, a cookie, is generally a set of data where the content of the data is controlled by the web server, and the applications of the web server. Thus, there can be risks associated with transmission and utilization of cookies to provide control over access to restricted information on a mainframe system. As described herein the security token utilized in an embodiment herein includes a mainframe user id, and this information is encrypted such that neither the client computer, nor the web servers, nor the applications can decrypt and access the information in the security token. Once the information in the security token has been decrypted by the middleware it can then be utilized by the mainframe system.

By identifying the user id provided in the security token, the mainframe can then refer to data tables in the mainframe system to identify which restricted information in the mainframe system a particular user is authorized to access. For example, in a brokerage company, there is frequently certain account information which can be accessed only by a limited number of the brokerage company employees. In some cases, brokerage companies will significantly limit the number of employees who can access brokerage account information where the brokerage account is owned by an employee of the brokerage firm. Also, certain accounts owned by high profile individuals such as politicians, business executives, or celebrities are restricted so only a limited number of employees can review data for such accounts.

The logon procedures provided in the web applications can be implemented using a number of different software languages, and can be implemented to provide for operation in a range of different software applications. As discussed above in one embodiment the sign on object is a browser helper object (BHO). The BHO in one implementation is an Internet Explorer BHO, which is written in C++ code, but other software languages could be used. The BHO is a registered COM DLL file such that it is loaded when the browser is loaded.

The sign on script elements are loaded onto the web servers, and can be incorporated into the web applications. The scripts are software modules which can be transmitted to the browser on the client computers. These software modules then instruct the BHO to follow the security/logon procedures to obtain and pass the security token. A package, or kit of different script modules can be created, such that the necessary scripts can be utilized by a range of different web applications.

The trusted site API 422 is also loaded on the client computers, and can be customized for receiving information identifying authorized application tables from the mainframe system. The Authentication server could be located at numerous locations with the network, but in one embodiment, the BHO should be able to communicate with the authentication server to receive the security token.

It should be noted that the above descriptions illustrate certain embodiments for illustrative purposes and one of skill in the art would recognize that specific implementations of the invention herein could be implemented in different ways. Thus, while various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

The invention claimed is:

1. In a distributed computing system a method of providing a user with access to data stored on a mainframe computer system, the method including:
   receiving a user login comprising a client computer user identifier by a client computer;
   receiving a selection of an application from a browser operating on the client computer, the application residing on a server computer;
   receiving, with a browser helper object loaded on the client computer, a sign on procedure signal;
   obtaining a security token authorizing access to restricted data stored on the mainframe computer system without requiring the user to enter any further user login information, the security token being obtained by using the browser helper object to transmit the client computer user identifier to an authentication server, and receiving a mainframe user identifier correlated to the client computer user identifier; and
   accessing the restricted data stored on the mainframe computer system with the client computer through the selected application utilizing the security token transmitted through the browser helper object.

2. The method of claim 1, further including:
   generating a trusted site table by the client computer;
   using the browser helper object on the client computer to determine if the selected application is in the trusted site table.

3. The method of claim 2, further including:
   storing trusted site information in the mainframe computer system;
   wherein generating the trusted site table on the client computer includes receiving, by the client computer, the stored trusted site information from the mainframe computer system.

4. The method of claim 2, wherein the trusted site table includes a reference to a file location of the selected application.

5. The method of claim 1, further including:
   generating the security token in the authentication server;
   encrypting the security token in the authentication server prior to transmitting the security token from the authentication server.

6. The method of claim 5, wherein the security token is decrypted by middleware before being utilized by the mainframe computer system to grant access to the restricted data.

7. The method of claim 1, wherein the security token includes the mainframe user identifier for the mainframe computer system corresponding to the user logged onto the client computer.

8. The method of claim 1, wherein the security token is obtained without the use of HTTP cookies.

9. A distributed system for providing a user with access to an application which utilizes information stored in a mainframe computer system, the distributed system including:
- a client computer coupled to a network, wherein a client computer processor of the client computer is programmed to provide web browser functions, and the client computer processor is also programmed to use a browser helper object with a client computer user identifier to obtain a security token to gain access to restricted data in the mainframe computer system without requiring the user to enter any further user login information, the security token being obtained by using the browser helper object to transmit the client computer user identifier to an authentication server, and receiving a mainframe user identifier correlated to the client computer user identifier;
- wherein the restricted data in the mainframe computer system is stored in a database in the mainframe computer system, the mainframe computer system being coupled to the network; and
- wherein a server coupled to the network is programmed to execute an application in response to a user selecting the application with the web browser, and the server transmits a signal to the client computer which causes the browser helper object to obtain the security token for gaining access to the restricted data in the mainframe computer system.

10. The distributed system of claim 9, further including:
- the authentication server coupled to the network and programmed to transmit the security token to the client computer in response to a signal received from the sign on module.

11. The distributed system of 10, wherein the authentication server operates to generate the security token, and the security token includes the mainframe user identifier for the mainframe computer system for a user logged onto the client computer.

12. The distributed system of claim 9 further including:
- a middleware computer coupled to the network and programmed to receive and process the security token to establish communications between the selected application and the mainframe computer system.

13. The distributed system of claim 9, wherein the client computer processor is programmed with a browser application, and the browser helper object provides the browser application with sign on functions.

14. The distributed system of claim 9, wherein:
- the client computer includes a table of trusted site information, the table of trusted site information being received from the mainframe computer system; and
- wherein the client computer operates to receive the trusted site information from the mainframe computer system, and verifies that the user selected application is identified as an application having access to restricted data in the mainframe computer system, prior to obtaining the security token.

15. The distributed system of claim 14, wherein the table of trusted site information is automatically updated each time the browser on the client computer is restarted.

16. A non-transitory tangible computer readable medium containing computer instructions that when executed by a computer processor on a client computer cause the computer processor to execute steps comprising:
- receiving a user login comprising a client computer user identifier by the client computer;
- receiving, by the client computer, a selection of an application residing on a server computer from a browser on the client computer;
- receiving, with a browser helper object running on the client computer, a sign on procedure signal;
- obtaining a security token authorizing access to restricted data stored on the mainframe computer system without requiring the user to enter any further user login information, the security token being obtained by using the browser helper object to transmit the client computer user identifier to an authentication server, and receiving a mainframe user identifier correlated to the client computer user identifier; and
- accessing the restricted data stored on the mainframe computer system with the client computer through the selected application utilizing the security token transmitted through the browser helper object without requiring the user to enter mainframe user login information.

17. The non-transitory tangible computer readable medium of claim 16, wherein the browser helper object comprises a Dynamic Linked Library.

18. The non-transitory tangible computer readable medium of claim 16 wherein the browser helper object receives a setting to lock the client computer after a period of inactivity defined by the setting.

19. The non-transitory tangible computer readable medium of claim 16 wherein the security token is encrypted, wherein the security token cannot be decrypted by the server.

20. The non-transitory tangible computer readable medium of claim 16 wherein the security token includes a user identifier for the mainframe computer system and an IP address of the client computer.

* * * * *